United States Patent
Acharya et al.

(10) Patent No.: US 6,343,326 B2
(45) Date of Patent: *Jan. 29, 2002

(54) SYSTEM AND METHOD OF TRANSFERRING INTERNET PROTOCOL PACKETS USING FAST ATM CELL TRANSPORT

(75) Inventors: Arup Acharya, North Brunswick; Rajiv Dighe, Princeton Junction, both of NJ (US)

(73) Assignee: NEC USA, Inc., Princetown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/080,208

(22) Filed: May 18, 1998

Related U.S. Application Data (63) Continuation-in-part of application No. 08/771,559, filed on Dec. 20, 1996, now Pat. No. 5,903,559.

(51) Int. Cl.⁷ ............................................. G06F 15/173
(52) U.S. Cl. ........................ 709/238; 709/242; 709/250
(58) Field of Search ................................ 370/351, 355, 370/254, 347, 395, 410, 331; 709/236, 230, 238, 242, 200, 245, 250

(56) References Cited

U.S. PATENT DOCUMENTS

| 5,440,547 A | 8/1995 | Esaki et al. |
| 5,506,847 A | 4/1996 | Shobatake |
| 5,517,497 A | 5/1996 | Le Boudec et al. |
| 5,600,638 A | 2/1997 | Bertin et al. |
| 5,623,605 A | 4/1997 | Keshav et al. |
| 5,638,371 A | 6/1997 | Raychaudhuri et al. |
| 5,689,501 A | 11/1997 | Takase et al. |
| 5,748,626 A | 5/1998 | Esaki et al. |
| 5,764,645 A | 6/1998 | Bernet et al. |
| 5,781,537 A | 7/1998 | Ramaswami et al. |
| 5,828,844 A | * 10/1998 | Civanlar et al. ............. 370/395 |
| 5,835,710 A | * 11/1998 | Nagami et al. ............. 370/351 |
| 5,892,761 A | * 4/1999 | Stracke, Jr. ................. 370/395 |
| 5,903,559 A | * 5/1999 | Acharya et al. ............ 370/355 |
| 5,907,542 A | * 5/1999 | Kuehnel et al. ............ 370/331 |
| 5,920,705 A | * 7/1999 | Lyon et al. ................. 709/238 |
| 6,016,319 A | * 1/2000 | Kshirsagar et al. ......... 370/410 |
| 6,055,561 A | * 4/2000 | Feldman et al. ............ 709/200 |

FOREIGN PATENT DOCUMENTS

JP    WO 97-28505    8/1997

OTHER PUBLICATIONS

H. Esaki et al. "High Speed Datagram Delivery over Internet using ATM Technology," INTERAP 95, pp. 1–9.
Abstract of JP–A 08–125692.
Abstract of JP–A 09–036908.
Abstract of JP–A 09–172457.

* cited by examiner

Primary Examiner—Ayaz Sheikh
Assistant Examiner—Philip B. Tran
(74) Attorney, Agent, or Firm—Sughrue Mion, PLLC (57) ABSTRACT

In a method of transmitting an IP packet between a source and a destination through an ATM network which has a node formed by an ATM switch and a packet router, a reception packet or cell is transmitted to the node on an unused or undefined VC and is sent to the packet router in the node. In the packet router, an output port is selected by the use of the unused VC to establish a switched virtual channel in the ATM switch and to transfer each packet through the switched virtual channel after the switched virtual channel is established, as long as the reception packet is sent on the same VCI. Neither signaling nor protocol is needed between the nodes.

20 Claims, 10 Drawing Sheets

FIG. 1A

| VP | VC | PORT |
|---|---|---|
| 0 | 0 | ROUTER |
| 1 | 1 | ROUTER |
| 2 | 2 | ROUTER |
| n | m | ROUTER |

FIG. 1B

| INPUT VC | PORT | OUTPUT VC |
|---|---|---|
| 1 | SIGNALING CONTROLLER | 1 |
| 2 | 4 (ATM CONNECTION 1) | 6 |
| 3 | ROUTER (UNUSED) | |
| 4 | ROUTER (UNUSED) | |
| 5 | 3 (ATM CONNECTION 2) | 4 |
| 6 | ROUTER (UNUSED) | |
| 7 | ROUTER (UNUSED) | |

FIG. 1C

| INPUT VC | PORT | OUTPUT VC |
|---|---|---|
| 1 | SIGNALING CONTROLLER | 1 |
| 2 | 4 | 6 |
| 3 | ROUTER (UNUSED) | |
| 4 | 2 (FLOW A) | 5 |
| 5 | 3 | 4 |
| 6 | ROUTER (UNUSED) | |
| 7 | ROUTER (UNUSED) | |

SYSTEM AND METHOD OF TRANSFERRING INTERNET PROTOCOL PACKETS USING FAST ATM CELL TRANSPORT

This application is a continuation in part of copending U.S. patent application Ser. No. 08/771,559, filed Dec. 20, 1996 U.S. Pat. No. 5,903,559.

BACKGROUND OF THE INVENTION

This invention relates to computer communication and networking and in particular to a method of transmitting, on a synchronous transfer mode (ATM) network, a packet which is formed in accordance with a protocol different from ATM and to a network system for transmitting the packet.

Increasingly communication over Internet network has become widely prevalent. Use of internet is bound to significantly increase further in the future. It is well known in the art that a typical network can be logically considered to comprise several layers including physical layer, data link layer, network layer, transmission layer, etc. In each of these layers different communication protocols are used. The Internet Protocol (IP) is used to carry out data transmission at the network layer of the internet. A Transmission Control Protocol (TCP) is used at the transport layer.

A synchronous transfer mode (ATM) is a high performance transmission protocol that can process a great deal of multimedia information. In such an ATM protocol, all information to be transferred is arranged within cells that have fixed lengths of 53 octets. A cell is composed of two fields; an information field and a header field. The information field is 48 octet long and a header field of 5 octet long. A message longer than 53 octets is divided into a plurality of cells.

Importantly, the ATM protocol has two hierarchical levels; a virtual channel level and a virtual path level. The virtual channel is a unidirectional transfer channel of an ATM cell which is specified by a unique value of an identifier. The identifier is called a virtual channel identifier (VCI) and is located within the header field.

Likewise, the virtual path is a unidirectional transfer path to which each virtual channel belongs and is specified by a virtual path identifier (VPI) which is also located within the header field. In an ATM all the cells having the same virtual channel connection and virtual path connection (VCC/VPC) are transferred through the same route in the network. The order of transmission of the ATM cells is maintained in the VCC. As a corollary, the ATM cell transmitted first is also received first.

On the other hand, a conventional IP network is implemented using routers. A message is divided into packets that have variable lengths, unlike an ATM cell. Each router receives a packet and from the address it determines an output port to which the packet is to be delivered. Therefore, in order to determine the output port, a great deal of processing is required in each router. This processing causes a bottleneck in data transmission in an IP network, affecting the transmission speed.

There have been several techniques suggested to remove such a bottleneck. Some of these techniques are aimed at utilizing the higher transmission speeds offered by ATM networks.

One such techniques is disclosed in Japanese Patent Unexamined Publication No. Hei 8-125692, namely, 125692/1996 (hereinafter, Reference 1). This technique uses a cell switch router (abbreviated to CSR). According to this technique, the CSR does not do an IP table look-up to detect an output port, as is done by normal IP routers. Instead CSR observes a certain attribute of each IP packet and selects an output port related to the attribute. It then extracts a VCI previously determined for this output port. Thereafter, the CSR converts the packet into a sequence of ATM cells. Each of these cells are provided with header information corresponding to the pre-determined VCI and then transferred. Thus, the CSR transfers IP packet in a manner similar to the ATM switch.

Using this technique, one can avoid the step of searching for the output port. Accordingly, this technique enables high speed transfer operation in comparison with the conventional technique that uses an IP router.

Herein, in the above-mentioned example, it should be noted that there are two important operations. Conversion and transfer operation by converting a network address of an IP packet (or a packet formed in accordance with a protocol of a different layer) into a simple virtual channel will be called a cut-through or a short-cut operation. Likewise, mapping an attribute of the network layer or an upper layer onto a VCI will be referred to as binding.

In addition, a mode and a path of the cut-through operation will be named a cut-through mode and a cut-through path respectively. These are also called a switched mode and a switched path, respectively.

When CSR is used, bindings associated with each attribute need to be determined a priori. In order to enable the binding, ATM connection setup needs to be carried out by either a PVC (Permanent Virtual Channel) or an SVC (Switched Virtual Channel).

In the other conventional techniques, such as IPOA (IP over ATM) and MPOA (Multi-Protocol over ATM), a virtual connection is also established between an origination point and a destination point for cut-through operations each time a sequence of packets is transmitted.

The conventional techniques mentioned above are disadvantageous at least in the sense that PVC based system needs to allocate a large number of VCs depending on network size and the number of attributes to be selected. Therefore, a PVC based system lacks scalability.

Likewise, an SVC based system has a shortcoming that the establishment of connection contributes to overheads that eviscerates the advantages resulting from a cut-through operation when the network session using ATM is short.

One conventional way of solving above-mentioned is disclosed in WO97/28505 (hereinafter, Reference 2) Therein, each node in a network comprises an ATM switch that has an IP routing module connected to it. This IP module identifies IP packet flow. In this event, each IP packet flow is defined by a combination of a transmission source address of an IP packet, a destination address, a port number on the TCP protocol. This IP packet flow is used to define a sequence of packets which form a session. According to a new version, IP v 6 of the IP Protocol, a flow identifier is also defined.

In the method of Reference 2, a default VC is used to transmit a flow. The default VC represents a PVC previously defined to send the flow to the router module of the node in question. Thus far, this method is similar to the operation carried out in a normal IP. The only difference being that the packet is transferred in the form of ATM cells.

Each successive node monitors continuation of the flow and simultaneously carries out signaling between its two adjacent nodes, namely the upstream node and the downstream node in accordance with a local protocol. This local protocol is called a flow management protocol and is not standardized. In this protocol the downstream node sends a signal to the node in question that shows the assignment of a VCI to the flow. In responsive to this signal, the node in question switches the flow from the default VC to a VC indicated by the downstream node.

When similar processing is repeated in each node on a hop-by-hop basis and is completed in all of the nodes, the flow in question is transferred in the cut-through mode through the cut-through path.

In this method, each node operates as a usual router when a flow is of a short duration and operates using an SVC in the cut-through mode when the flow is continued for a comparatively long time. This method does not have the loss of efficiency that occurs in other conventional methods mentioned above. Herein, it is to be noted that in the method of Reference 2 a signaling protocol is run for a period of time between the nodes to establish a virtual connection. During this time each node is operated as a router.

During a multicast operation, an important aspect of the IP protocol, a substantial problem is noted in methods that carry out signaling between nodes. Multicast operation is used for simultaneously delivering a packet to a plurality of reception nodes. Such a multicast operation is performed using protocols like IP multicast protocol, also known as a dense mode PIM (Protocol Independent Multicast), a DVMRP (Distance Vector Multicast Routing Protocol), etc.

In such a conventional IP protocol, each transmission node transfers a multicast packet without recognizing reception nodes. Specifically, a connection for the multicast is established in the existing IP protocol after a reception node receives a first packets and returns a signal indicating the receipt.

In general, a network connection is completed when a connection request is issued from a transmission side and a reception side responds to the connection request and informs that the reception side can be connected. In other words, the network connection is completed when the transmission side receives acknowledgement from the reception side.

It can be clearly seen that it is impossible to establish a connection for the IP multicast prior to acknowledgement from each reception node in the path because each reception node is not known apriori to the transmission node.

In order to solve this problem, one conventional a system uses a MARS (Multicast ATM Routing Server) as a multicast server. In this system, all the multicast flows are sent from the transmission nodes to the server. The server detects each reception node in the path of each multicast flow and executes delivery of each multicast flow. It can be seen clearly that a heavy load is imposed on the server. Therefore, this approach is restricted to a network of a small size.

Another serious problem in a conventional cut-through technique is that a router mode can not be resumed once it shifts to a cut-through mode. In such a case, the point of introducing ATM technique as a means for operating the IP network at a high speed is lost. Because, such an operation results in deviating from the IP protocol permanently. Such a result is undesirable because conventional cut-through techniques can not cope with dynamic changes that characterize an IP network.

The problems in conventional systems that use cut-through techniques to realize a high speed operation on a native IP network by using ATM can be summarized as follows:

1) PVC based systems have a problem of reduced scalability.
2) SVC based systems that use signaling have difficulties with IP multicast.
3) There is no way to revert back to the router mode once cut-through mode is established.

SUMMARY OF THE INVENTION

It is therefore an object of this invention to provide a high speed switching method that overcomes the above problems.

It is a specific object of this invention to provide a network system which is available for packet transfer using not only an internet protocol but also a protocol substantially equivalent to the internet protocol.

It is another object of this invention to provide a network system of the type described, which does not require signaling between adjacent routers.

It is still another object of this invention to provide a high speed switching method which is applicable to an IP multicast as well as mobile IP.

It is a specific object of this invention to provide a method which is capable of transferring, at a high speed, a packet which corresponds to IP protocol, by transferring a control packet necessary for packet transfer control after establishment of a cut-through path.

It is a yet another object of this invention to provide a network system which is identical to an ATM network at the cell level and which is capable of carrying out both existing ATM cell exchange as well as fast IP packet transfer.

According to this invention, each node which is arranged in a network is structured by an IP routing module and an ATM switch and has a function of identifying a packet flow, like in Reference 2. However, this invention is completely different from Reference 2 in that a VC is set up by a first or an initial packet of a flow and a control packet and is sent to the routing module. The control packet is defined by an IP protocol and an upper protocol.

In this structure, the ATM switch hardware is used for high speed transport of packages but the network operates like a native IP network.

According to an aspect of this invention, a network system is operable in response to a packet flow which defines a single session and which is formed on the basis of a predetermined protocol, to transmit the packet flow through an ATM network to a destination. The ATM network converts the packet flow into a sequence of ATM cells and comprises a source for transmitting the sequence of the ATM cells by the use of an unused VCI (Virtual Channel Identifier) and a node each of which has a plurality of input ports and a plurality of output ports. Each of the nodes comprises a router for determining one of the output ports from information included in the ATM cells that carry a first packet of the packet flow and a mechanism to associate the determined one of the output ports with the unused VCI thus setting a switched path. The node further comprises an ATM switch for transporting the remaining ATM cells except the selected one of the ATM cells through the determined one of the output ports without control of the router when each of the remaining ATM cells has a VCI identical with the unused VCI.

According to another aspect of this invention, a method is for use in transmitting a connectionless packet between a source and a destination over an ATM network comprising at least one node that includes a packet router and an ATM switch connected to the packet router. The packet router has a lookup table while the ATM switch has a plurality of input ports, a plurality of output ports, and a routing table for identifying a plurality of VCIs. The method comprises the steps of:

a) initializing the routine table in the ATM switch so that an input VCI is mapped to the packet router connected to the ATM switch;

b) transferring a packet to the packet router connected to the ATM switch when the connectionless packet is transmitted from the source to the ATM switch on an unused VC;

c) identifying one of the output ports of the ATM switch by said pocket router in accordance with the above-mentioned packet and the lookup table placed in the packet router;

d) establishing a switched path at the ATM switch by mapping the input VCI onto the one of the output ports;

e) forwarding, simultaneously with the establishing step d), the packet to a downstream ATM through the one of the output ports by the use of an unused VCI on an output side of the ATM switch; and f) repeating the steps c) to g) on a hop-by-hop basis until a switched path is established between the source and the destination to set up a virtual path between the source and the destination so that the following connection packet is allowed to pass through the switched path.

LIST OF FIGURES

The above objectives and advantages of the present invention will become more apparent by describing in detail preferred embodiments thereof with reference to the attached drawings in which.

DESCRIPTION OF THE PREFERRED EMBODIMENTS

Referring to FIGS. 1A through 1C, 2 and 3, the principle of this invention will be discussed. Further, features, merits, and various embodiments according to this invention will be discussed for a better understanding of this invention.

In FIGS. 1A through 1C, 2 and 3, the method for forwarding/routing IP packets is shown. Herein, establishment of a connection according to this invention using an ATM network is described. In such an ATM network, a connection is set up on an end-to-end basis.

Such a connection is divided into a plurality of links. Each link within the connection uses a VCI specific to it. Each node transfers packages between an input VCI and an output VCI. This shows that each node owns a VC space on its downstream link.

Figure 2:
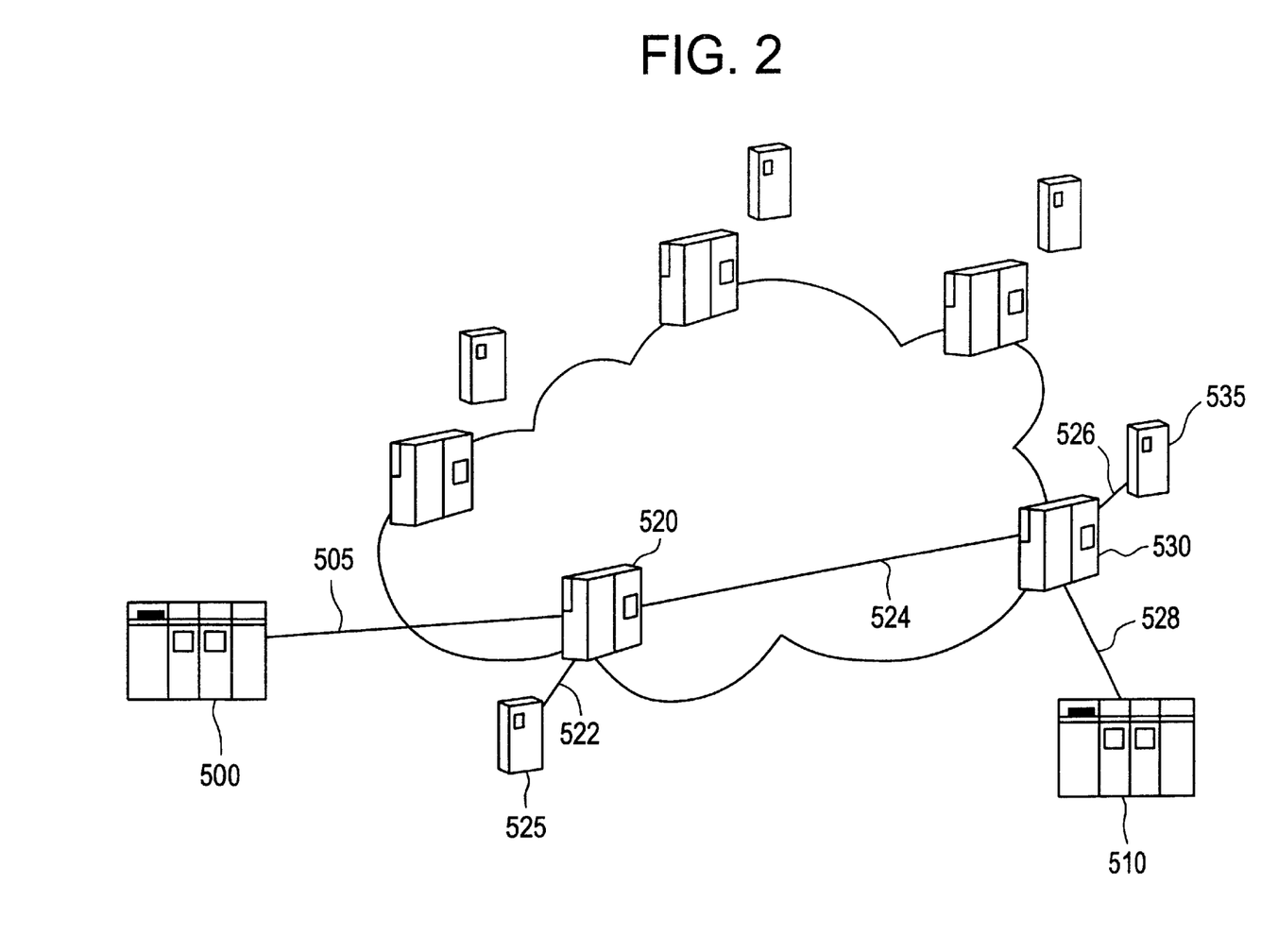
FIG. 2 shows an example of a network which carries out operation in accordance with this invention.
Figure 3:
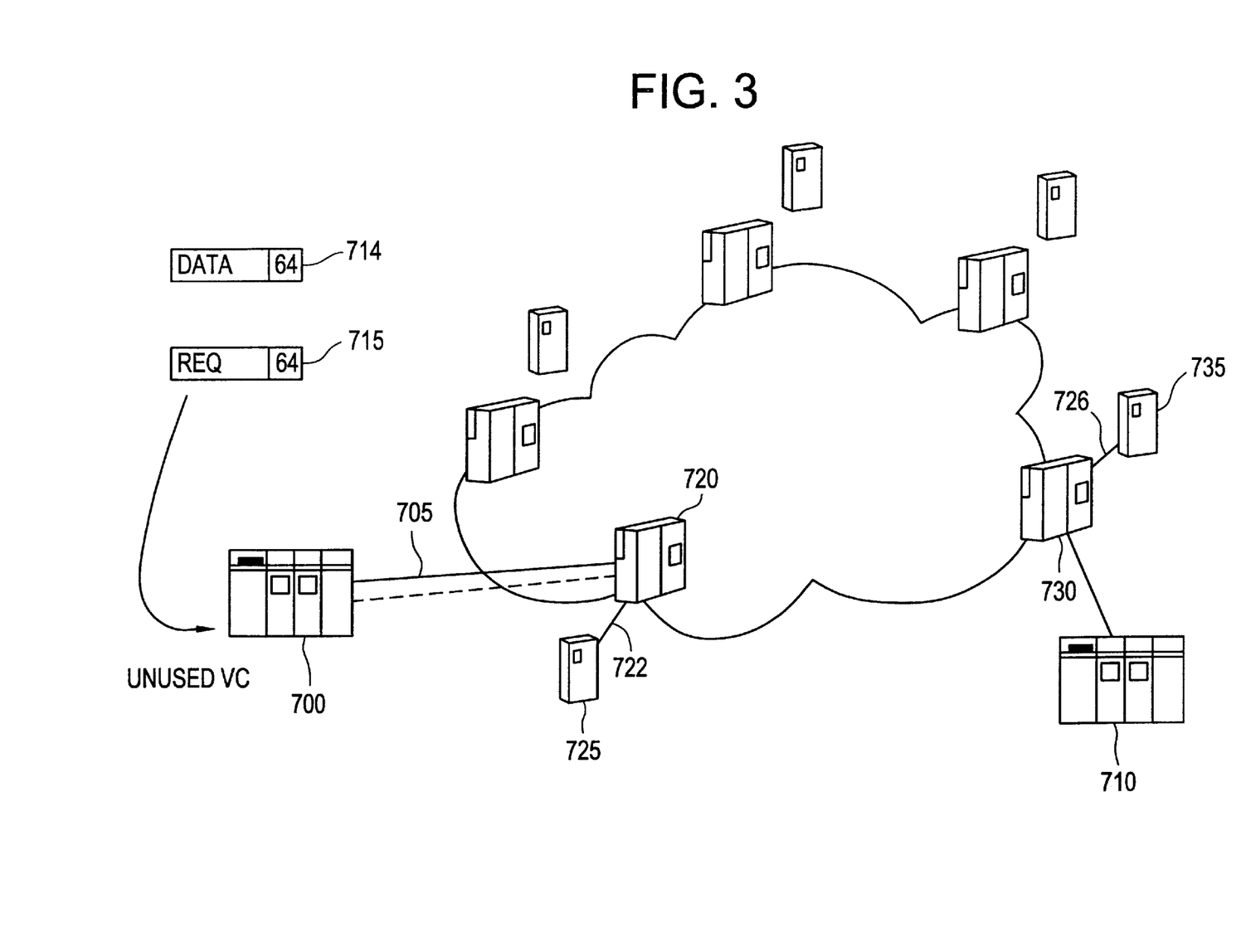
FIG. 3 shows a network diagram for carrying out a part of operation according to this invention when a peek and reserve (RESERVE) protocol is applied.

In the case shown in FIG. 2, it is assumed that a connection is set up or established between a source node 500 and a destination node 510 through an ATM network. In this event, the ATM network has a plurality of nodes such as 520 and 530, each of which comprises an ATM switch and an IP router, such as 525 and 535, logically coupled to the ATM switches in 520 and 530.

With this structure, the source node 500 carries out VC mapping for a link 505 which is directed from the source node 500 towards the ATM switch 520 while the ATM switch 520 carries out VC mapping for a link 524 which is directed from the ATM switch 520 towards the ATM switch 530.

Moreover, it is to be noted in FIG. 2 that the ATM switches 520 and 530 have ports which are connected to the individual IP routers 525. ATM switches 520 and 530 have ports which are connected to the individual IP routers 525 and 535. Herein, each of the ATM switches 520 and 530 is assumed to have a VC space which is recognizable between the ATM switches 520 and 530 and which is initially determined.

Figure 1A:
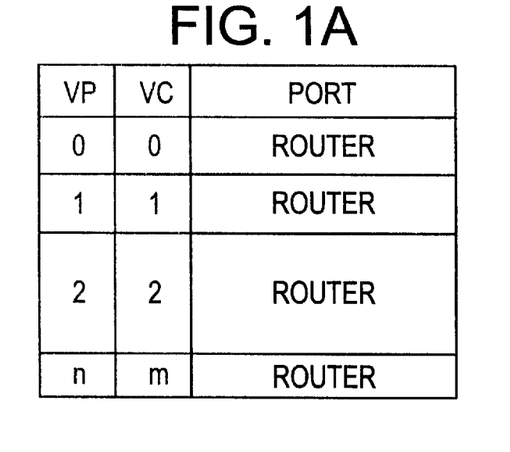
FIGS. 1A, 1B, and 1C show a mapping state of a node for use in describing a principle of this invention.

In FIG. 1A, a VC routing table in each ATM switch is shown. In the illustrated routing table, all of unused VCs indicate switch ports which are directed to the IP router, such as 525, 535, as a destination port, when the ATM switch is initially set up, as illustrated in FIG. 1A. Herein, it should be noted that the unused VCs are those that are undefined on an ATM connection and are freely available.

Figure 1B:
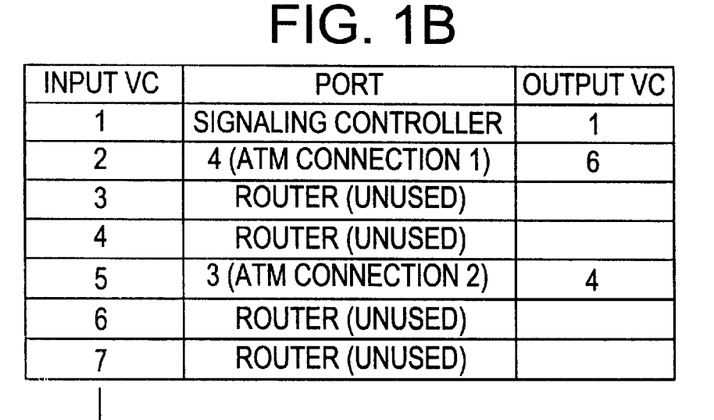
Figure 1C:
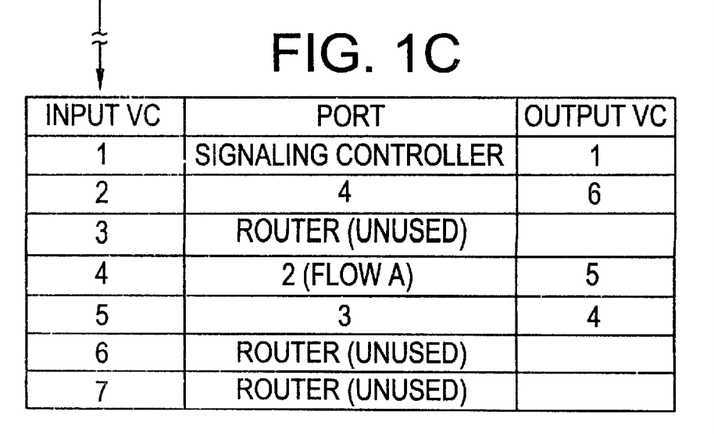

Next, operation of the ATM switch 520 and the IP router 525 will be described with reference to FIGS. 1B and 1C. As shown in FIG. 1B, relationships between the input VCs and the output Ports and between the output VCs and the output ports are stored in the ATM switch 520 and the IP router 525. Since the input VCs 3, 4, 6, and 7 are unused VCs in the example illustrated in FIG. 1B, the IP router 525 is connected to the ATM switch 520 when each of the unused VCs 3, 4, 6, and 7 is available to the ATM switch 520.

Now, let the source node 500 select the unused VC 4 for a flow A and supply the unused VC to the ATM switch 520 in the form of a sequence of ATM cells. In this event, a first group of the ATM cells that holds the unused VC containing a first packet of the flow A is delivered to the IP router 525 in accordance with the table illustrated in FIG. 1B. The IP router 525 carries out routing processing to judge that the flow A in question is to be delivered to the output port 2. In this case, the output port number in the table is rewritten into the output port 2 which corresponds to the unused VC 4, as shown in FIG. 1C. In the example illustrated in FIG. 1C, the flow A is transported or transferred to a downstream side by the use of an output VC 5.

Herein, it is assumed that the source node 500 receives an IP packet of a connectionless type and selects one of the VCs as an available VC from a pool. As mentioned before, the ATM switch 520 has the VC routing-table which is stored in an ATM line interface card and which is given the available VC determined for the flow. The VC routing table in the ATM switch 520 detects that the available VC given from the source node 500 is unknown in the ATM switch 520 and is detected as an unused VC.

The source node 500 may be an ATM switch which actually generates the flow or which may be an edge device or switch which the flow subjected to routing encounters at first.

Supplied with the unused VC through an input port of the ATM switch 520, the ATM switch 520 directs or guides the connectionless IP packet to the IP router 525 in the form of the ATM cells. In other words, the connectionless packet is routed to the IP router in response to the unused VC. Therefore, this mode will be referred to as a routed mode.

While the IP router 525 carries out processing to determine an output port of the ATM switch 520 for the connectionless IP packet, the ATM cell sequence related to the connectionless IP packet is successively stored in a buffer (Buf) which is previously determined for the unused VC in question. Thus, a next hop is determined by the IP router 525. An output port is decided on the basis of the first packet. In the illustrated example, the output port which is connected to the link 524 is decided by the IP router 525. In this event, a new unused VC is selected for the link 524.

After the link 524 is decided, the ATM cells stored or buffered in the buffer (not shown) are redirected along the new VC to the output port connected to the link 524.

When the new VC is an unused VC in the ATM switch 520, the ATM switch 520 first selects the unused VC for the link 524. Subsequently the VC routing table included in the input line interface card is changed to reflect that this VC has been changed. The ATM switch 520 transfers the connectionless IP packet in the form ATM cells along with the unused VC towards a downstream node, this being the ATM switch 530 and its corresponding IP router 535 which forms the next hop. The unused VC is arranged within a header field of the ATM cell.

The ATM switch 520 then establishes a switched virtual channel (SVC) between the input Port and the output port under control of the IP router 525 and is put into a cut-through mode, namely, a switched mode. Thereafter, subsequent ATM cells are transported towards the downstream node using the switched virtual channel (SVC). This shows that the next packet belonging to the flow in question which is received by the ATM switch 520 is not sent to the IP router 525 but is directly transferred to the downstream node in the cut-through mode. In other words, the IP router 525 is bypassed by the subsequent IP Packets in the cut-through mode.

The above-mentioned method can be summarized as follows. First, each flow is processed in the routed mode and is switched to the cut-through mode after the initial packet is processed. Second, transfer in the cut-through mode is guaranteed for subsequent packets belonging to the same flow using the same VC. This means that following IP packets are not processed by any of the IP routers within the established connection path. Third, no signaling operation is needed between adjacent nodes nor end-to-end nodes to have a routed mode switched to a cut-through mode. Finally, it is possible for ATM processing based on a conventional connection and IP cut-through processing according to this invention to coexist on the same ATM switch.

As mentioned before, using the method of this invention, one can set up a VC between the source and the destination without any signaling between nodes or ends. However, it is to be noted that the above-mentioned method can not process any additional control messages sent by the IP router once the flow has been switched to the cut-through mode. This makes it difficult to return back to the routed mode after the cut-through mode is set up.

In a cut-through mode, one can use a method of utilizing a predetermined default PVC or another unused VC to directly transfer, to an IP router, a message (for example, a control message) which is to be processed by the IP router that is on the connection path of the flow. This means that this control message is not passed through the cut-through path in the cut-through mode.

Instead of utilizing the default VC or another unused VC, another aspect of this invention uses a method of transmitting an operation administration management (OAM) cell by using an identical VC. This method is effective to transfer the control message in the cut-through mode, as will become clear later. In this case, two kinds of the OAM cells are preferably used when the control message or packet is sent during transmission of the flow. Specifically, it is preferable that a first OAM cell is used for allowing all of the following data cells to pass through the routed path while a second OAM cell used for allowing data cells to pass through the cut-through path or for returning the same back to the cut-through path.

There are several advantages that will be discussed about the relative merits of sending such a control message at the beginning of, during, and at the end of the flow.

In the above description, it is assumed that the cut-through path, for example a cut-through ATM connection, is established in a forward direction. In other words, the cut-through connection is set up at each of the ATM switches on a hop-by-hop basis in the forward direction.

However, it is also possible to set up an ATM connection in a reverse direction at every hop by the use of a specific protocol, simultaneously with the setting up the ATM connection in the forward direction.

This method will be named PRESERVE which is the abbreviation of "Peek and Reserve" standing for carrying out observation in the forward direction and reserving a connection in the reverse direction.

Figure 4:
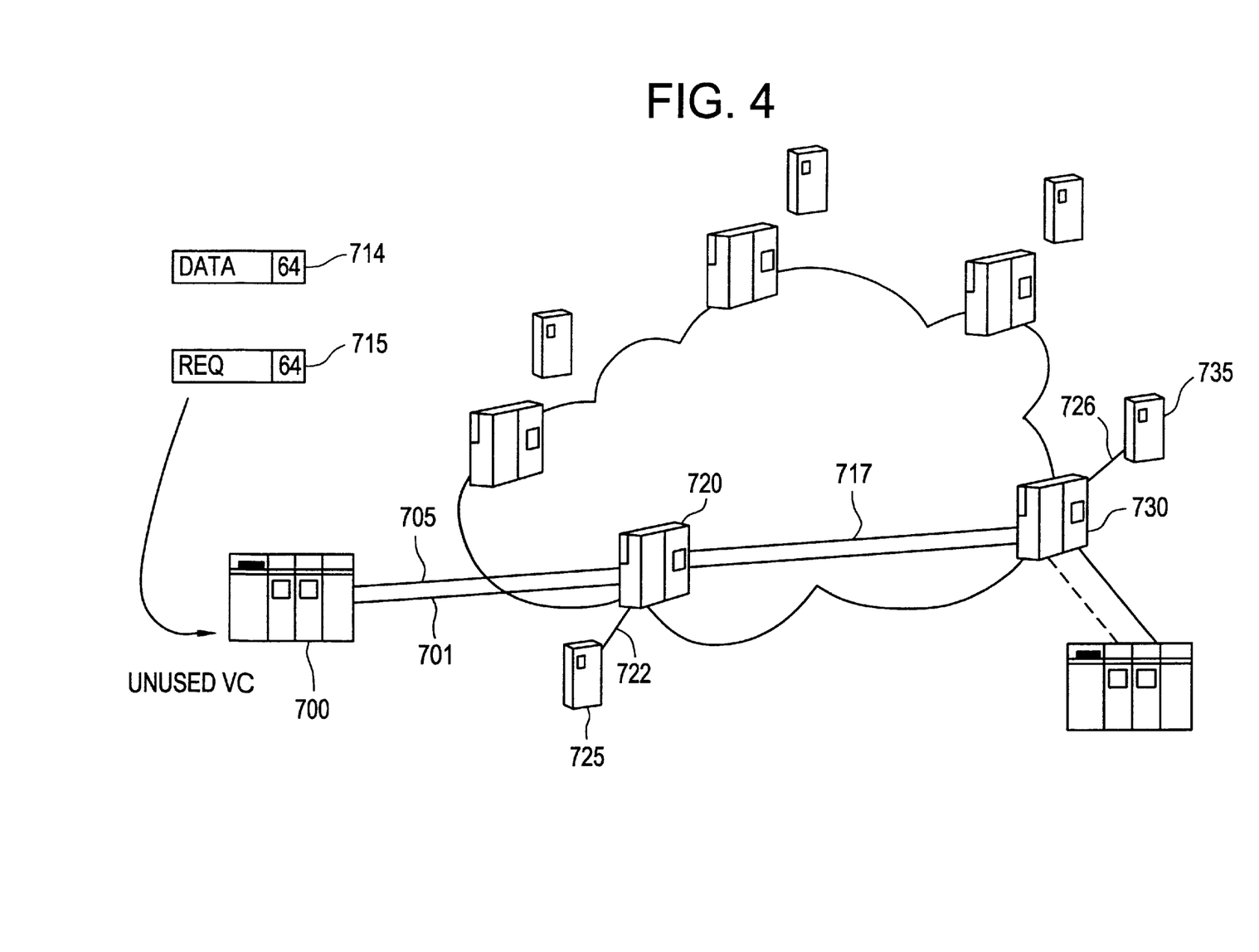
FIG. 4 shows a network diagram for describing operation which is carried out after the operation illustrated in FIG. 3 is carried out.
Figure 5:
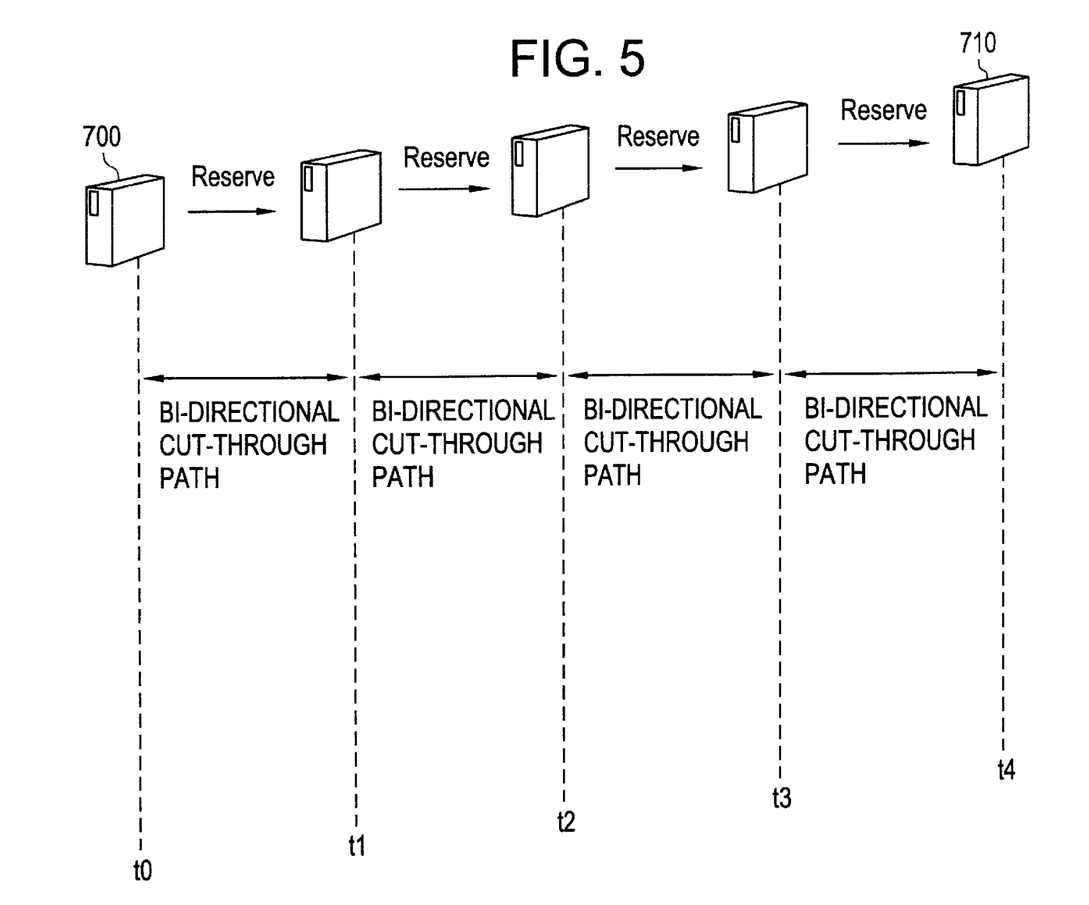
FIG. 5 shows a diagram for use in describing a relationship between a message and a cut-through path in a method illustrated in FIGS. 3 and 4.

Referring to FIGS. 4 and 5, the application of PRESERVE protocol to a system is described, wherein a source (SRC) 700 issues a transmission request to a destination server (DEST) 710 to mike the destination server 710 return information back, to the source (SRC).

Specifically, the request 715 is at first allowed to pass through a network from the source (SRC) 700 to the destination server (DEST) 710 via a routed path. Thereafter, a switched path 701 is established in the reverse direction by the method according to this invention which may be called IPSOFACTO, as shown in FIG. 4. In the illustrated example, the request 715 is issued from SRC 700 with an unused VC "64" indicated.

Furthermore, the ATM switches 720 and 730 which are operable as transfer switches forward the request in the forward direction using VCs which correspond to the above-mentioned unused VC.

Responsive to the request, the destination server (DEST) 710 transmits a data stream in the reverse direction by the use of the VC which is identical to that attached to the request. As a result, bi-directional cut-through paths 705 and 717 are established between the SRC 700 and the DEST 710, as shown in FIG. 4, before a data stream 714 is sent from the SRC 700. Thereafter, the SRC 700 sends the data stream 714 on the identical VC "64". According to this procedure, it is possible to suppress data buffering in a switch controller to a minimum when decision is made about IP routing.

Referring to FIG. 5, a flow is processed in accordance with the PRESERVE protocol in the illustrated manner. This flow is assumed to be a call. In this event, the SRC 700 indicates establishment or set-up of a connection between the SRC 700 and the DEST 710. Such a set-up operation is started by allowing a RESERVE message to pass through a network which is connected between the SRC 700 and the DEST 710.

In the illustrated example, three of the ATM switches are interposed between the SRC 700 and the DEST 710 and may be referred to as first, second, and third ATM switches from a nearest one of the ATM switches in the order. During passage of the RESERVE message, the RESERVE message is received at each ATM switch at a different instant and is transferred downwards in the forward direction.

Responding to the RESERVE message, each ATM switch sets up a cut-through path or a switched path in the reverse direction opposite to the forward direction. The cut-through path is bi-directional and may be called a bi-directional cut-through path. As shown in FIG. 5, the cut-through path is established between the SRC 700 and the first ATM switches at a time instant t1. Likewise, the cut-through path is formed between the SRC 700 and the second ATM switch at a time instant t2 via the first ATM switch. Similar operation is carried out by all the ATM switches interposed in the connection, until the bi-directional cut-through path is completely set up at a time instant t4. As readily understood by those skilled in the art, it is preferable that the bi-directional cut-through path be set up or established on a hop-by-hop basis, simultaneously with passage of the RESERVE message which may serve as a signaling message.

In such a network, it is necessary to inform or notify each ATM switch that the flow is suitable for setting up the cut-through path in the reverse direction. This flow-related information is transmitted by the use of an OAM cell. The transmission of the OAM cell may be considered as a control message transmission.

Figure 6:
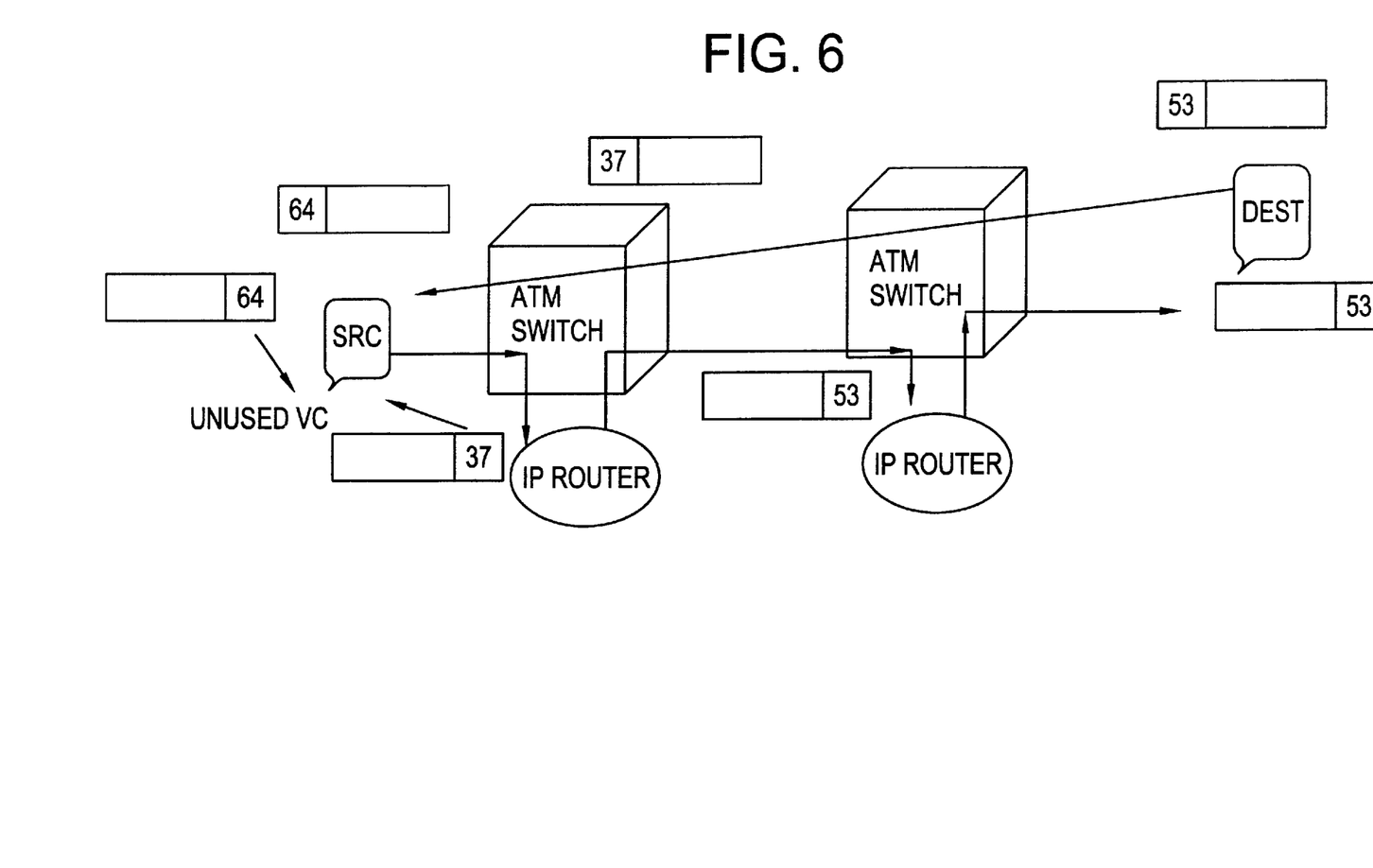
FIG. 6 shows a network diagram for use in describing a relationship between a routed path and a cut-through path in a network which is illustrated in FIGS. 4 and 8.

Referring to FIG. 6, similar operation can be performed on a network which includes the SRC, the DEST, and two ATM switches between the SRC and the DEST. In FIG. 6, the SRC is given a request (Req) and selects an unused VC (specified by "37" in this figure) to transmit an ATM cell to an ATM switch. The ATM cell includes the unused VC assigned before the request.

The ATM switch sends the request (Req) to an IP router with the unused VC included in the request (Req). The ATM switch selects an output port with reference to the request (Req) and selects an unused VC (specified by "53" in this example) to send the request (Req) along with the unused VC "53" downstream. In this event, a cut-through path is formed by the use of a VC "64" between the ATM switch and the SRC.

A routed path is formed between two adjacent IP routers due to passage of the request (Req) while a cut-through path is set up. Under the circumstances, a data stream which follows the request (Req) is bi-directionally transmitted through the cut-through path between the SRC and the DEST.

According to this invention, it is possible to set up and tear down a connection by interpreting each control packet according to the kind of IP protocol. In order to facilitate an understanding of this invention, IP traffic used in the IP protocol will be classified into a plurality of classes. Control operation in each class, which is carried out in accordance with this invention, is described.

IP Traffic Classification and Control according to this invention:

1. IP traffic of a Pure data stream with no signaling:

Examples of this classification are UDP (User Datagram Protocol) Packets, such as ping requests/responses, IGMP (Internet Group Management Protocol) packets, or the like. Each of these packets is composed of a single packet flow and, therefore, there is no advantage in setting up a cut-through path for each packet of this kind. However, no penalties are incurred, if such an IP packet is mapped onto an unused VC and the connection related to the unused VC terminated when no packet is received for a certain duration of time.

When reusing VCs is most important, like in the IGMP, a message may be transmitted on an unused VC but the unused VC may be immediately returned back to an unused VC space after it is used. Such a message according to the IGMP is delivered only to an adjacent hop.

2. Class of IP capable of setting a reverse path by implicitly signaling:

UDP-based NFS (Network File System) traffic is an example. Such a traffic is transaction oriented. In such traffic, a UDP request is sent in a forward direction while a requested datagram is sent in a reverse direction. In this case, the PRESERVE protocol may be used to set up a cut-through path in the reverse direction while a routing operation is executed in the forward direction.

3. Class of IP having an explicit signaling packet:

All TCP (transmission control protocol) based traffic, such as web traffic, falls into this class. TCP is connection oriented and has packets which are defined to explicitly carry out set-up/release of a connection and which may include a SYN packet and a FIN packet for set-up/release, SYNACK and FINACK are packets defined for acknowledgement of the SYN and the FIN packets.

The method according to this invention can be realized by the using explicit signaling. More specifically, all the signaling packets discussed above are passed through a routed path while subsequent data packets are passed through a cut-through path once a virtual channel is set up. In case of TCP, the SYN packet is used to set up a cut-through path while the FIN packet is used to tear down the cut-through path.

In the above-mentioned method, a TCP connection can be set up or torn down in a forward direction by the use of the SYN/FIN packet sent from a sender or a source while the TCP connection can also be set up or torn down in a reverse direction by the use of the SYNACK/FINACK packets.

4. Class of IP capable of sending a control packet during a session:

This class includes IP-multicast, resource reservation protocol (RSVP), mobile IP, and the like. The RSVP will be described later in detail.

In this invention, all of signaling/refreshing packets that belong to this class are transferred through a routed path while subsequent data packets are transferred through a cut-through path. It is noted that a virtual channel is set up by a signaling packet.

Next, a general procedure for transmitting an IP packet according to this invention, taking the above classes into consideration, is discussed.

At first, a routed path is selected as an initial path by the IP packet. To create such a routed path, a first, second, and third methods which use an unused VC, a default VC, and an ATM OAM cell, respectively, can be used. Each IP packet is checked by an IP router and is classified in the manner mentioned above. After classification, each data packet is switched to the cut-through path.

Traffic is monitored at the IP level in this invention. Specifically, the cut-through path is eliminated from a table, as shown in FIG. 1(A), when a specific protocol message, such as PFUNF, FIN, is sent on the routed path. For TCP flows, a connection is set up or conversely torn down by the TCP handshake protocol (SYN, SYNACK, FIN, FINACK).

As readily understood by those skilled in the art, the method according to this invention which may be named IPSOFACTO can shorten a set-up time for the TCP traffic in comparison with the conventional techniques. Additionally, the method according to this invention allows situations to exist where a TCP session is torn down in one direction but continues in the other direction. Such situations may be called TCP half-close. The method of this invention can be used with general applications such as rush, and web browsers, such as Netscape.

The method of this invention, named IPSOFACTO, is also naturally applicable to protocols concerned with the IP-multicast and the like. This is because no specific protocol between nodes. Further, the IP Protocol can be executed on each ATM switch without any modification. In general, there are three common protocols for the IP multicast. They are:

1) Distance Vector Multicast Routing Protocol (DVMRP),
2) Multicast OSPF (MOSPF: Multicast Open Shortest Path First), and
3) Core-based trees (CBT).

1) The DVMRP is widely used on the worldwide multicast backbone (abbreviated to Mbone). Herein, it is to be noted that the Mbone is an experimental service and is used to develop IP multicast software and services. This experiment provides digitized audio and video applications as well as services for whiteboards, a radio channel. The Mbone uses source specific multicast trees and is closely coupled with an underlying unicast routing protocol (RIP). This method is effective when groups have dense membership and when a routing bandwidth is sufficient enough (LANs, MANs). In any event, it should be noted that multicasting is not connection oriented in the IP protocol, as mentioned before.

A multicast datagram differs from a unicast datagram in view of the fact that a group address is present within a destination address field of an IP header included in the multicast datagram. The multicasting is carried out by the use of a class D destination addressing format which may be, for example, (224.0.0.0–239.255.255.255).

2) Next, MOSPF—which uses a unicast routing Protocol of the OSPF which defines a state of links instead of the RIP—is described. MOSPF has not been widely used currently, but has great potential for the future because it uses the underlying unicast routing protocol which is shared with a routing protocol on the ATM network, namely, the PNNI (Private Network-Network Interface).

3) CBT uses a shared multicast tree for the group. The common root of the group is called the Rendezvous Point (RP). In CET, all the multicast packets are transported as encapsulated unicast packets along the tree, independently of the underlying routing protocols. Tree nodes send explicit join messages to the RP to which a unicast address is allocated.

Internet Engineering Task Force (IETF) has recently combined CBT and DVMRP into PIM (Protocol Independent Multicast). In the PIM, the DVMRP is used for a dense mode while the CBT is used for a sparse mode.

Taking the above into account, how IP multicast situations are varied using the method according to this invention, is discussed.

When IP multicast is implemented on the existing Ethernet, the IGMP (Internet Group Management Protocol) is run on a designated rouser (DR) so as to identify or recognize information for specifying a multicast group to which each host or terminal belongs. In addition, the IGMP learns about group members that are directly attached to the designated router (DR).

Specifically, a query is sent to a specific group, namely a whole host multicast group (for example, (224.0.0.4)), in the form of a multicast to determine whether or not receivers for the specific multicast address group are present. Such a query is repeated at a short period of, for example, 5 seconds. Each receiver for a group (225.0.0.1) sets a local timer and the receiver whose timer is reset sends a response on 225.0.0.1 with a time to live (TTL) kept at 1. This response is received by all members of the group and also by the IP router (which monitors all multicast addresses). In the router, information related to the group member is refreshed and kept therein. If no response is received on a certain group after a certain number of cycles, the router removes the group state. Additionally, each receiver sends a -join request as soon as it desires to join a group without waiting for the next query.

According to the method according to this invention, the IGMP is mapped in the following manner.

1. A query is periodically sent from the ATM switch as an ATM broadcast. Along with this query, an indication for ATM one-to-multiple mapping is transmitted to the group which is put into an active state.

2. A receiver responds to the query. If an ATM multicast channel for a specific group exists, the channel in question is used for the response. If no group specific ATM multicast channel exists, the response is sent on all the hosts.

3. When a host on the receiver side joins the group (for example, 225.0.0.1) as a member, the host picks up a random VC from its pool and sends an IGMP response which gets trapped by the switch.

The ATM broadcast and the multicast as mentioned above can be executed by the use of a function which is prepared as hardware function in the ATM switch. Herein, the mapping on the VC table will depend on the specific switch implementation. In the case where a specific ATM switch has a cell forwarding mechanism which can execute address filtering on an output side, an address is converted into a new bit map address which is afresh generated for cells of the group.

Figure 7:
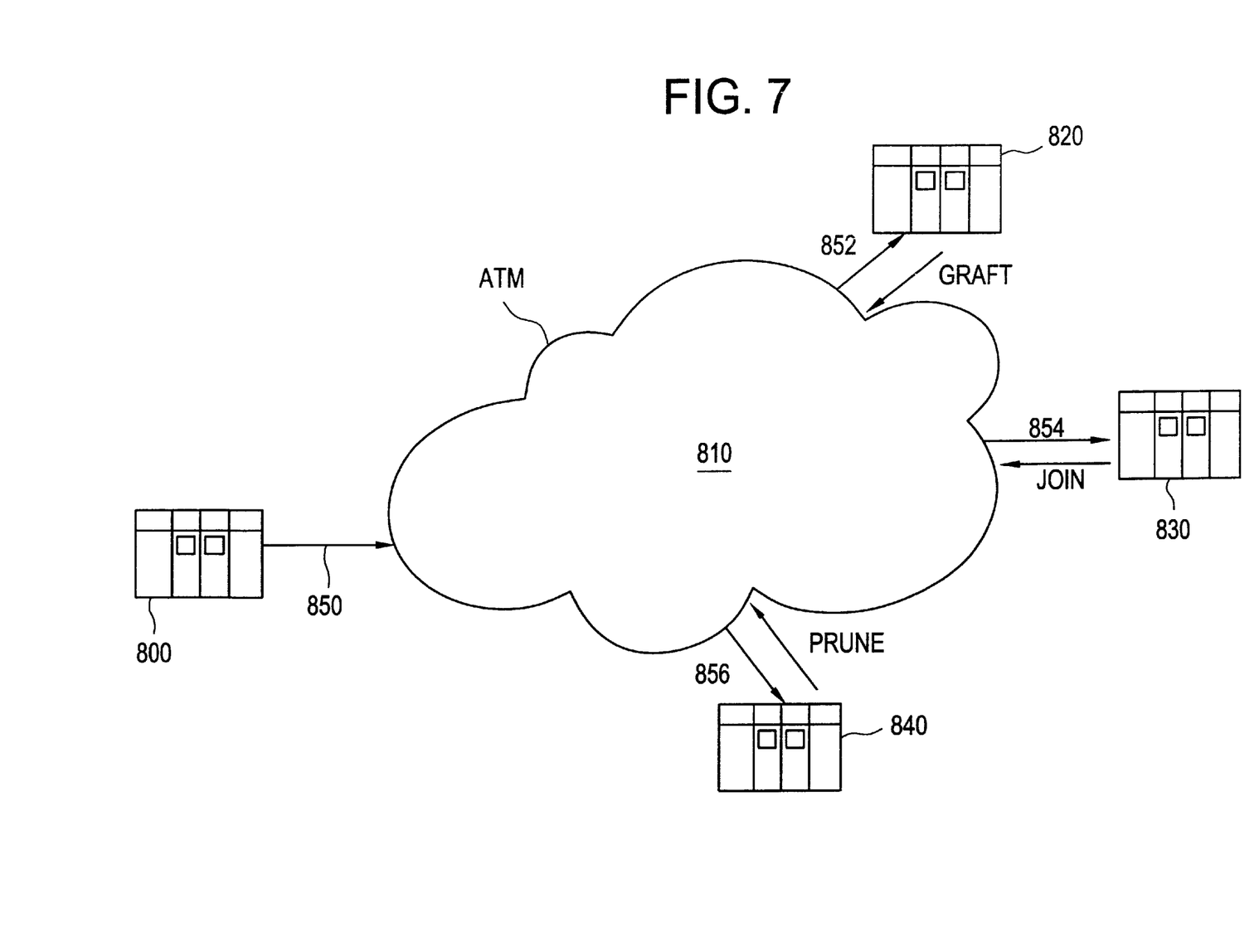
FIG. 7 shows a network diagram for use in describing operation which is based on an IP multicast application and which is carried out in accordance with this invention.

Referring to FIG. 7, an IP multicast operation using this invention will be described. The illustrated network comprises an ATM network 810 and a plurality of ATM switches (not shown) in the ATM network. The ATM network is connected to a source (SRC) 800 and a plurality of receivers (RCV) 820, 830, and 840.

In the illustrated example, a multicast operation will be described among the SRC 800 and the RCVs 820, 830, and 840. Herein, it is assumed that each ATM switch can access the corresponding IP router in a manner, as mentioned before.

In the illustrated implementation, a control message, such as PRUNE, GRAFT, and JOIN, which is defined by the IP protocol and which is concerned with a connection, is transmitted on a routed path while a data stream transmitted among the SRC 800 and each RCVs 820 to 840 is transmitted on a cut-through path. This method is advantageous in that the function of the IP multicast can be simply and directly mapped onto the underlying ATM switch hardware. In this event, scalability and dynamic flow characteristics are kept intact which are prepared for the IP multicast protocol.

Figure 8:
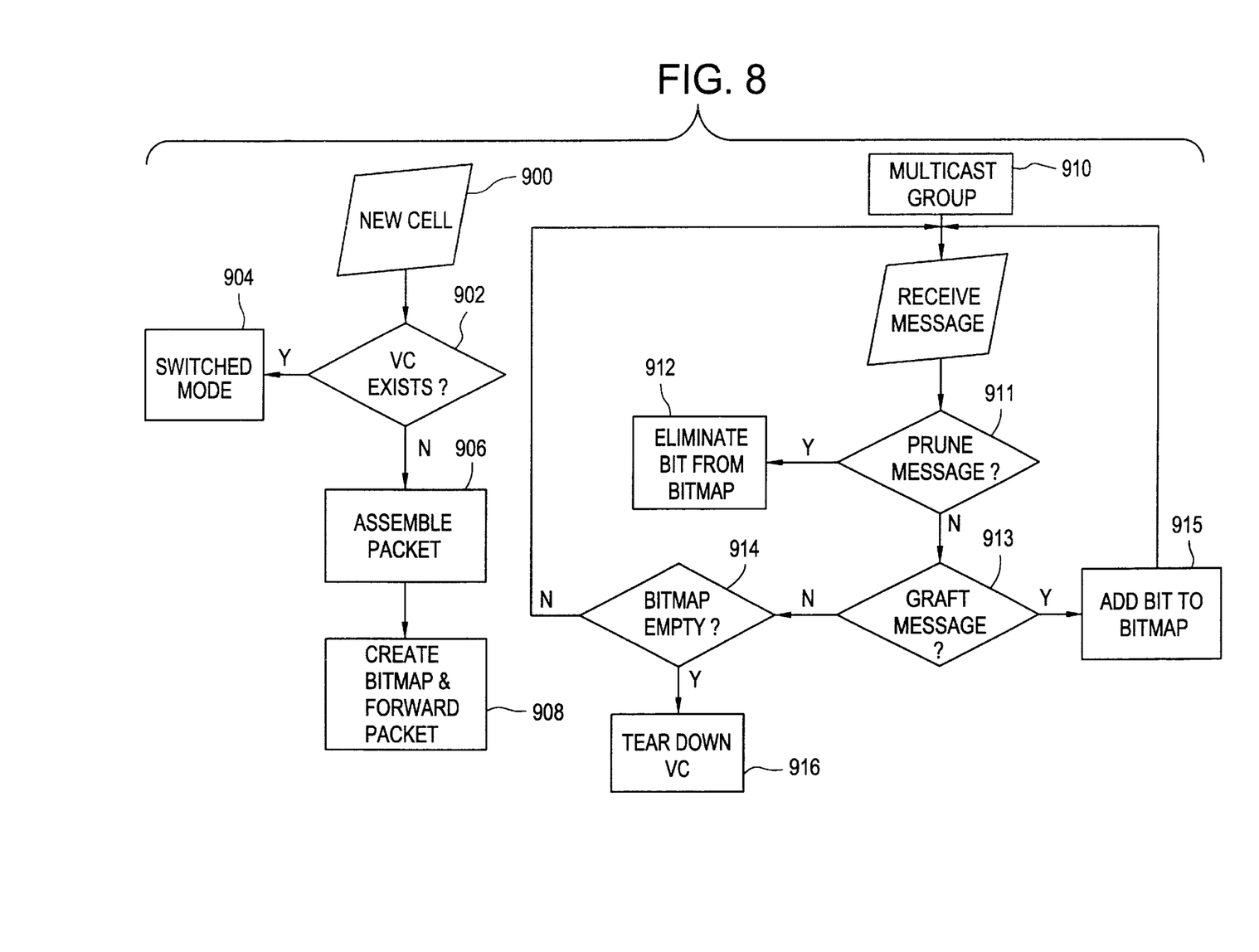
FIG. 8 shows a flow chart for use in describing operation carried out when the method according to this invention is applied to the DVMRP.

Referring to FIG. 8, the implementation of the DVMRP protocol according to this invention is described. At first, a node receives a multicast packet in the form of a sequence of ATM cells (Step 900) and judges whether or not a VC is already present for transmitting the cell (Step 902) in the node. When such a VC is present in the node, the cell is transferred in a cut-through mode. On the other hand, when such a VC is not present, a packet is assembled in the node, as shown at Step 906 and is transferred to a next node (Step 908) after a one-to-many broadcast bitmap is formed in the node.

Supplied with the PRUNE message (Step 911) from a multicast group (910), the node clears a bit corresponding to this group from the bitmap (Step 912), because the PRUNE message represents absence of a receiver.

When all the PRUNE messages are returned back to the other groups, every bit is cleared from the bitmap. This state of the bitmap reflects or specifies an actual multicast tree. When all of the bits are cleared and the bitmap is empty (Step 914), the VC in question is torn down at Step 916. Conversely when the GRAFT message which specifies a multicast group is received by the node in question (Step 913), a bit is set in the bitmap, as shown at Step 915.

Herein, the application of this invention to RSVP (Resource Reservation Protocol) is considered. For a better understanding of this invention, RSVP is described. As known in the art, RSVP is a protocol especially designed for an integrated services internet. RSVP enables applications to set up reservations over a network so as to respond to various kinds of requests.

Herein, it is considered that RSVP defines a receiver-based model. In this connection, each receiver reserves a resource for and maintains it in an active state as long as possible.

Specifically, RSVP is an internet control protocol which is used by applications to guarantee predetermined quality of service on a network and is never a routing protocol. Therefore, RSVP plays a role to, in setting up and maintaining the resource reservation on a distribution tree.

A typical flow in RSVP begins with a PATH message which is sent from a source or sender to a destination or receiver prior to transmission of a data packet stream. In the PATH message, the sender includes information related to the destination (flow spec), a traffic class, and a necessary resource (Tspec). In addition, it also includes an Adspec field which the PATH message typically indicates the state of congestion in each node located in a forward path, namely, an average delay over a set of time constraints.

When a PATH message arrives at the receiving node, the node compares the delay expected on that path (Adspec) with the delay requested by the application (Tspec) and then transmits a RESV message on the reverse path. Importantly, RSVP is a soft state protocol which is reset after lapse of a predetermined time interval and the flow should be kept by periodically producing the PATH message. Furthermore, bandwidth requests may be varied at each of the PATH messages based on the needs of an application. This method is particularly suitable for non-stationary sources, such as video.

It is to be noted that the RSVP flows are conveniently mapped to ATM Quality of Service (QoS) based classes. Practically, the ATM technique is one of the few technologies that allows the RSVP to request resources and then fulfill those requests. Unfortunately, the existing ATM signaling does not support bandwidth renegotiation. Consequently, mapping from the RSVP to the ATM is not efficient because each PATH message brings about a new VC set-up which needs new signaling.

Taking the above into consideration, RSVP is mapped onto the ATM in accordance with this invention.

As mentioned before, RSVP flow begins with the PATH message sent from a sender and may be considered to be a message concerned with a connection. Responsive to the PATH message, an upstream router selects an unused VC for this flow and transmits the unused VC in the form of an OAM cell. The message is processed by an RSVP/routing module placed on an IP router port. Subsequently, the following IP packets are transported on a virtual channel for particular service classes (CBR, VBR, ABR, or UBR).

During the above operation, resources are not guaranteed. However, such a guarantee is accomplished by marking all cells with cell loss priority, namely, CLP=1 and by making no resource reservation for the VC. Upon receipt of a corresponding RESV message in the reverse direction, the resources are locked in by invoking a connection admission control (CAC) module. All subsequent packets on that flow are sent with CLP=0 and an appropriate equivalent bandwidth is allocated for that flow.

The above-mentioned method according to this invention is advantageous in that dynamic renegotiation can be carried out for the RSVP flow without tearing down the connection or allocating a new VC.

Figure 9:
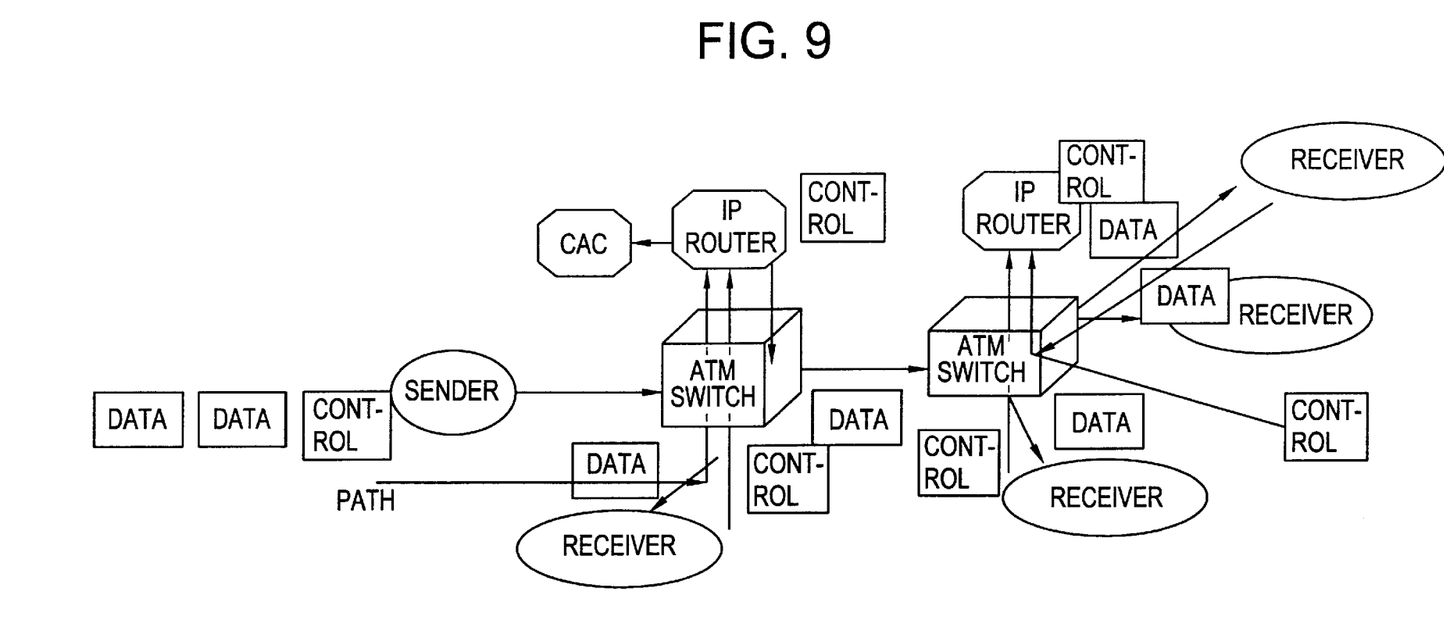
FIG. 9 shows a network diagram for use in describing operation carried out when the method according to this invention is applied to the RSVP.

Referring to FIG. 9, the RSVP implementation which carries out the above-mentioned operation in connection with a multicast flow is described. In FIG. 9, the sender supplies an upstream node with the PATH message prior to the following data packet. In this case, the PATH message is sent as a message which has a function of a source reservation request. In the upstream node, an ATM switch identifies the PATH message and sends the same to the RSVP/routing module which is operable as an IP router and which is connected to an IP router port. The IP router selects an unused VC and transmits the unused VC on a virtual channel in the form of an OAM cell. The OAM cell is transmitted to a downstream ATM switch which forms a downstream node. The OAM cell is sent to an IP router of the downstream node through the downstream ATM switch and the IP router selects a virtual channel on the basis of a specification requested by the PATH message. In the illustrated example, one-to-many multicast VCs is set by the IP router. The following IP packets are transmitted on cut-through paths specified by the multicast VCs.

Now, description will be directed to aggregation of flows in a core network. As readily understood by those skilled in the art, switching on a per-flow basis becomes expensive as the switching is carried out near to the core of the network. Taking this into account, it is generally desirable to switch the aggregated flows at the core of the network.

Since the method according to this invention uses a dual IP/ATM protocol stack, it is possible to execute VP-level aggregation of the flows at the core of the network by using either PVCs or SVCs on the native ATM Protocol stack and to carry out the switching at every flow by the use of the method, namely, IPSOFACTO, according to this invention at the edge of the core network. In this event, a plurality of flows which pass through a cut-through path are mapped onto a route-based VC which is set up by the use of the native ATM stack.

This shows that switches located in the core of the network may only carry out switching on the basis of the VP and may not carry out switching on a per-flow basis. The job of aggregating a plurality of flows into a VP is made at the edge switch which is operated in accordance with the method of this invention. Setting up an SVC (or PVC) through the core formed by the ATM switches needs information from the IP routing module. One of the options for this is to use IP source routing at the edge of the core network and to set a SVC up for a given route. Such SVCs are torn down only when all flows on the given route are extinct.

Figure 10:
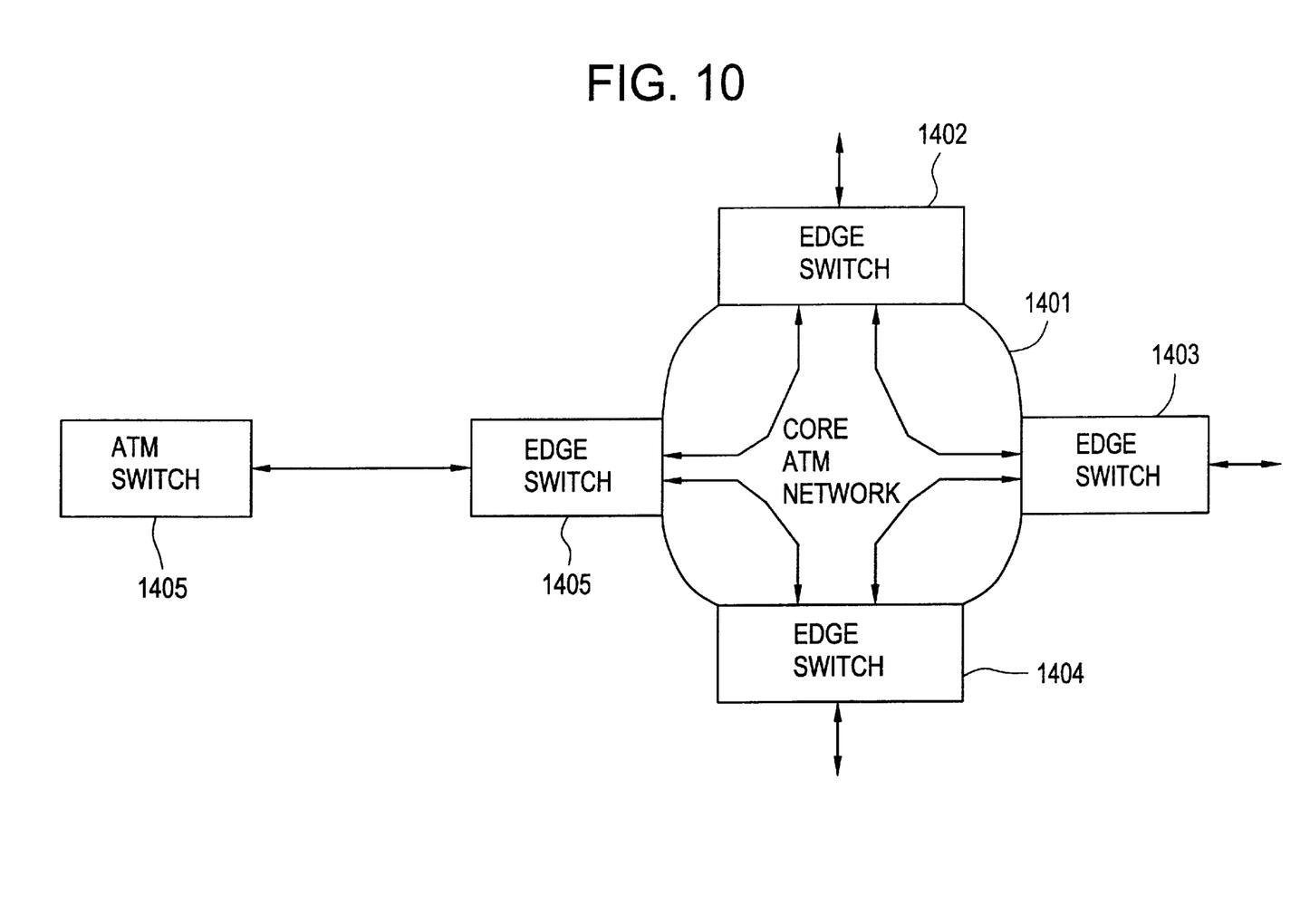
FIG. 10 shows a block diagram for use in describing a network system which is operable on the basis of this invention and which includes a core ATM network and edge switches.

Referring to FIG. 10, a network system carries out the aggregation of the flows in the above-mentioned manner. The illustrated network system includes a core ATM network 1401 and a plurality of ATM switches 1402, 1403, 1404, and 1405 which are arranged at a periphery of the core ATM network 1401 and which serve as edge switches mentioned above. Among others, the ATM 1405 is connected to an ATM switch 1406 on the hop-by-hop basis. When a flow is received by each edge switch, for example, the ATM switch 1405, an SVC (VP/VC) for the flow is set up for a given route routed to the output ATM switch placed on an output side of the core ATM network 1401. Subsequently, the edge switch transfers the following flows destined to the output ATM switch, on the same VP by the use of different VCs. In the output ATM switch, the VP/VC are torn down upon reception of a final packet of a last one of the flows.

Although the IP protocol has been exemplified in the above-description, it is readily understood that the method according to this method is not restricted to the IP protocol but all of the other protocols (for example, IPX (Internet Packet Exchange) or the like) that can be handled by a routing table connected to each ATM switch. This is because the method according to this invention is non-protocol oriented.

Thus, the IP protocol or the other protocols can be naturally mapped onto each ATM switch in this invention. This means that a fast transport function and a guarantee function of quality of services in the ATM technique can be effectively merged into a worldwide internet system in this invention. From this fact, it is to be understood that a key feature of this invention is not to use each ATM switch as a switch of the ATM network on packet transfer but to use it as hardware for fast packet transport or transfer. Consequently, each switch node can execute fast packet transfer in accordance with the IP protocols without ATM signaling or without using a particular protocol locally determined between nodes, independently of the other nodes. Concurrently, each ATM switch can be also used as a native element of the ATM network on transferring an ATM cell. This is because the ATM switch is operable on the basis of the dual IP/ATM protocol stack. At any rate, it is said that the method according to this invention is very flexible and can also cope with various kinds of the protocols other than the ATM protocol.

While this invention has thus far been described in conjunction with several embodiments thereof, it will readily be possible for those skilled in the art to put this invention into practice in various other manners. For example, this invention is applicable to the shared trees, the mobile IP, and the like.

What is claimed is:

1. A network system having a predetermined protocol for transmitting a packet flow through an ATM network to a destination, said packet flow comprising at least a first packet and said packet flow being converted into a sequence of ATM cells, said system comprising:

a source for transmitting said sequence of ATM cells using an unused VCI (Virtual Channel Identifier) wherein the unused VCIs are VCIs that have not been preassigned to an output address; and a node comprising a plurality of input ports and a plurality of output ports, wherein said node further comprises:
a plurality of input ports;
a plurality of output ports;
a router for determining one of said plurality of output ports using information included in a subset of the ATM cells that carry the first packet, said router associating said one of said plurality of output ports with the unused VCI thereby without using hop by hop massaging, thereby setting a switched path; and
an ATM switch for transporting the ATM cells through the determined one of the output ports without control of the router when each of the ATM cells has a VCI identical with the unused VCI.

2. The network system of claim 1 further comprising a downstream node located downstream of said node and said system sets up a VC without signaling between the node and the downstream node.

3. The network system of claim 1, wherein the packet flow comprises a succession of connectionless packets.

4. The network system of claim 3, wherein each of the connectionless packets is an IP (Internet Protocol) packet.

5. The network system of claim 3, wherein each of the connectionless packets is a packet selected from a group consisting of an IP packet, IPX (Internetwork Packet Exchange) Protocol, and other protocols having properties similar to IP and IPX protocols.

6. The network system of claim 3, wherein each of the connectionless packets is a packet defined by a frame relay that is a connection-oriented protocol.

7. The network system of claim 3, wherein the node sends a control packet capsulated by OAM cells to a downstream router, said OAM cells being prescribed in the network.

8. A method of transmitting a connectionless packet between a source and a destination over an ATM network, said ATM network comprising at least one node that comprises a packet router and an ATM switch connected to the packet router, the packet router having a lookup table, the ATM switch having a plurality of input ports, a plurality of output ports, and a routing table for identifying a plurality of VCIs, the method comprising:

a) initializing the routing table such that an input VCI is sent to the packet router;

b) transferring a packet to the packet router when the connectionless packet is transmitted on an unused VC, wherein the unused VC is a VC that has not been preassigned to an output address;

c) identifying one of the output ports;

d) establishing a switched path at the ATM switch by mapping the input VCI onto the one of the output ports;

e) forwarding, the packet to a downstream ATM through one of the output ports using an unused VCI on an output side of the ATM switch; and f) repeating the steps c) to e) on a hop-by-hop basis until a switched path is established so that following packet flow is through the switched path,
wherein said identifying is done by the packet router using information in the packet and the lookup table only without signalling with a downstream node,
wherein step d and step e are simultaneous.

9. The method of claim 8, wherein step d is done by using a specific VC that is predetermined for transferring the connectionless packet to the p-oriented finish packet through the routed path;

tearing down the virtual channel; and transferring an acknowledgement packet from the destination to the source on the hop-by-hop basis for tearing down the virtual channel in the reverse direction.

10. The method of claim 8, wherein the establishment step d) is performed by using an OAM (Operation, Administration, and Maintenance) cell which is defined on the ATM network to transfer the connectionless packet to the packet router.

11. The method of claim 8, wherein the establishment step d) is performed so that all the connectionless packets are transferred from the source to the destination through a selected one of the virtual channel and a routed path established through the packet router.

12. The method of claim 8, wherein the connectionless packet which is transferred via the packet router from the source to the destination is an OAM packet as well as a control packet while the connectionless packet which is transferred via the virtual channel from the source to the destination is a packet which is different from the OAM packet and the control packet.

13. The method of claim 8, wherein the establishment step d) further comprises the step of:

establishing an upstream-directed switched path simultaneously with the establishment of the downstream-directed switched path so as to establish a bi-directional switched path between the node and the downstream switch.

14. The method of claim 12, wherein the establishment step d) further comprises the steps:

transferring a packet which has a function of a connection request, to a routed path formed through the packet router, in a forward direction on the hop-by-hop basis when an upper protocol concerned with the connectionless packet is connection oriented;

establishing a virtual channel from the source to the destination on the hop-by-hop basis;

transferring a packet which has a function of acknowledgement, to the routed path in a reverse direction on the hop-by-hop basis to establish a virtual path in the reverse direction.

15. The method of claim 14, wherein the establishment step d) further comprises the steps of:

transferring a finish packet which is representative of a finish of a connection and which is defined by the connection-oriented protocol, through the routed path;

tearing down the virtual channel established from the source to the destination on the hop-by-hop basis; and transferring a packet which is representative of acknowledgement of the finish packet, from the destination to the source on the hop-by-hop basis to tear down the virtual channel in the reverse direction.

16. The method of claim 11, wherein the connectionless packet has an upper protocol which reserves a network resource, wherein step d) comprises the steps of:

transferring, onto the routed path, a request packet which is defined by the upper protocol and which is representative of reservation of the resource; and establishing an ATM virtual channel in response to the request packet on a hop-by-hop basis.

17. The method of claim 8, further comprising the steps of:

g) establishing a first flow with an SVC (VP/VC) in accordance with the steps a) to f) to make the first flow enter an ingress ATM switch node and to make the first flow exit from an egress ATM switch node;

h) transporting, the following flows destined for the egress ATM switch, on the same VP by the use of different VCs; and i) terminating the VP/VC when a final packet of a last flow arrives by the egress ATM switch.

18. A method of transmitting a packet between a source and a plurality of destinations over an ATM network which comprises at least one node formed by an ATM switch and a packet router connected to the ATM switch, the method comprising the steps of:

establishing a routed path on a hop-by-hop basis between the source and destination in each of said at least one node in the ATM network;

establishing a switched path which corresponds to the routed path and which is formed between the source and each of the destinations through the ATM switch in each of said at least one node, wherein the unused VCs are VCs that have not been preassigned to output addresses;

transferring a control packet on the routed path;

transfering a data packet from the source on a virtual channel when the virtual channel is established by the switched path, said virtual channel being established in correspondence to the routed path;

transfering the data packet from the source on a routed path when the virtual channel is not established; and delivering the data packet to each of the destinations.

19. The method of claim 18, wherein the routed path is established at each packet router independent of other packet routers.

20. The method of claim 18, wherein the switched path comprises:

monitoring a multicast address which is included in a packet header and which is transferred through the routed path;

judging a set of the destinations to which a multicast flow is delivered;

forming a VC table which corresponds to the set of the destinations; and changing the VC table in accordance with the control packet sent through the routed path.

* * * * *